United States Patent [19]

Handte

[11] 4,224,561

[45] Sep. 23, 1980

[54] METHOD AND APPARATUS FOR REGULATING THE SPEED OF A CONVEYOR

[75] Inventor: Herbert Handte, Filderstadt, Fed. Rep. of Germany

[73] Assignee: Moog GmbH, Boblingen, Fed. Rep. of Germany

[21] Appl. No.: 21,151

[22] Filed: Mar. 16, 1979

[30] Foreign Application Priority Data

Mar. 28, 1978 [DE] Fed. Rep. of Germany ....... 2813241

[51] Int. Cl.³ .......................... G05B 1/06; B29F 3/00
[52] U.S. Cl. .................................... 318/663; 318/571; 425/150; 425/167
[58] Field of Search ........................ 318/571, 663, 39; 425/140, 145, 148, 150, 167

[56] References Cited

U.S. PATENT DOCUMENTS

| | | | |
|---|---|---|---|
| 3,693,946 | 9/1972 | Merritt | 425/167 |
| 3,940,465 | 2/1976 | Hauser et al. | 425/167 X |
| 4,078,198 | 3/1978 | Murakosi et al. | 318/663 X |
| 4,159,293 | 6/1979 | Fukase et al. | 425/150 X |

*Primary Examiner*—B. Dobeck
*Attorney, Agent, or Firm*—Sommer & Sommer

[57] ABSTRACT

An improved regulator is provided for varying the rotational speed of a screw conveyor arranged to supply material to a variable-volume chamber having a piston slidably mounted in a cylinder. The regulator produces a sum signal proportional to the algebraic sum of positive input signals reflecting the desired degree of chamber filling and the desired discharge volume, and negative input signals reflecting the actual filling volume and the actual degree of chamber filling. This sum signal is converted to a proportional time-dependent signal which is used to adjust the speed of the conveyor. The conveyor speed is increased or decreased by an amount depending on the magnitude and polarity of the sum signal. In use, the regulator practices an improved method of regulating the speed of a conveyor.

12 Claims, 4 Drawing Figures

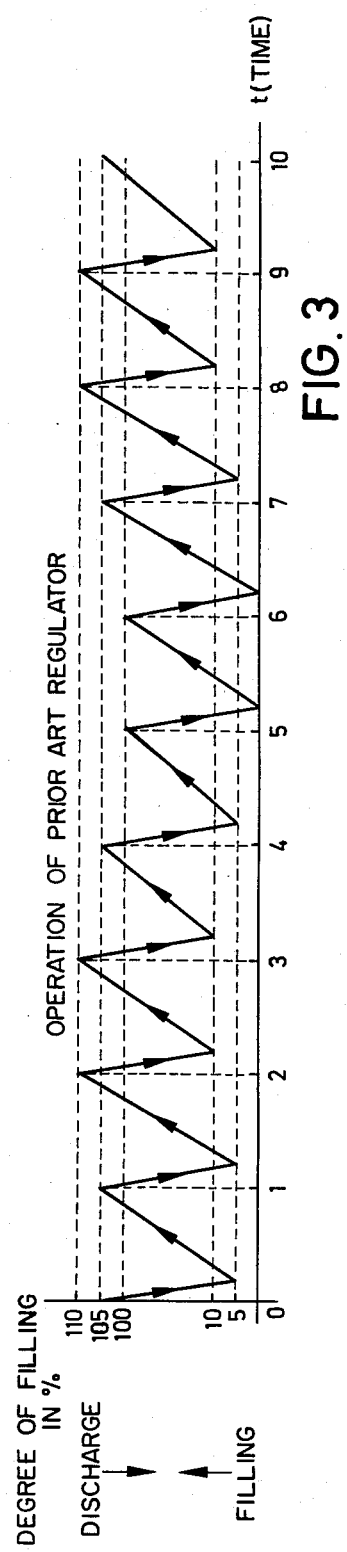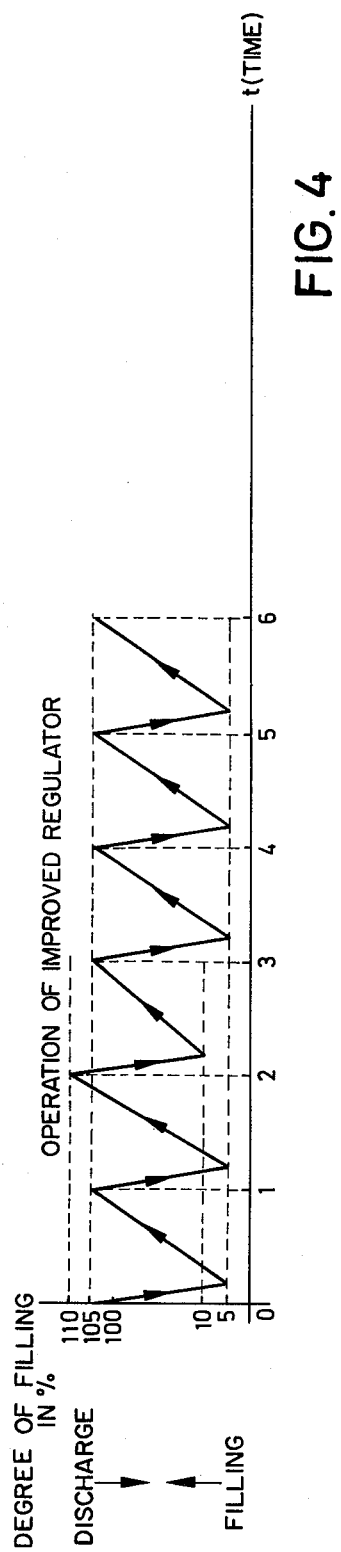

METHOD AND APPARATUS FOR REGULATING THE SPEED OF A CONVEYOR

BACKGROUND OF THE INVENTION

1. Field of the Invention

The present invention relates generally to a method and apparatus for regulating the speed of a conveyor, and more particularly to an improved method and apparatus for regulating the speed of a screw conveyor arranged to supply plasticized material to a variable-volume chamber in extrusion apparatus, particularly that used in blow-molding operations.

2. Description of the Prior Art

In blow-molding operations, a cylindrical preform or parison is initially extruded, and then inflated to the desired shape in a blow-mold. In such extrusion apparatus, a screw conveyor is arranged to convey plasticized material to a variable-volume chamber formed by a piston slidably mounted in a cylinder. Between discharge operations, the conveyor supplies material to fill the chamber. The piston may be moved in the opposite direction to discharge material from the chamber. In order to use the apparatus as efficiently as possible, material should be discharged into the mold as soon as the mold is ready to receive such material. Hence, the speed of the conveyor should be set to convey a desired volume of material to the chamber in the available fill time. Any deviation in such conveyed volume of material may adversely affect performance of the apparatus.

In one known form of such apparatus, the degree of chamber filling is sampled at the beginning of each discharge operation. In other words, conveyor speed is determined by plunger position at the beginning of the discharge operation. If any deviation from a desired degree of chamber filling is detected, the speed of the conveyor is appropriately varied to increase or decrease the volume of material thereafter supplied to the chamber. However, it has been found that this known type of regulator is unstable, constantly over corrects, and causes the plunger stroke to fluctuate about a mean value. This causes undesirable vibration and oscillation, particularly if the parison volume is relatively large.

In another known type of such apparatus, the conveyor speed is not regulated, but held constant. The material supplied by the conveyor pushes the plunger back to a specific location, indicating availability for discharge. However, if the conveyor speed is set too slow, the mold may be in a "ready" condition before the chamber is filled, and a waiting interval must be tolerated. Conversely, if the conveyor speed is set too high, the chamber may be filled excessively and too much material may be discharged if the plunger is pushed forwardly to a specific location or mark on the cylinder.

SUMMARY OF THE INVENTION

The present invention provides a unique method and apparatus for regulating the speed of a conveyor, such as that typically used in extrusion apparatus of the type described.

The improved method broadly comprises the steps of: generating a first signal indicating the desired degree of chamber filling; generating a second signal indicating the desired volume of material to be discharged from the chamber; generating a third signal indicating the actual volume of material supplied to the chamber; generating a fourth signal indicating the actual degree of chamber filling; producing a sum signal, S, according to the equation, $S = K$ [fourth signal − first signal + third signal − second signal], where K is a constant; and varying the rotational speed of the conveyor in response to the sum signal.

The improved apparatus broadly comprises: first means for generating a first signal indicating the desired degree of chamber filling; second means for generating a second signal indicating the desired volume of material to be discharged from the chamber; third means for generating a third signal indicating the actual volume of material supplied to the chamber; fourth means for generating a fourth signal indicating the actual degree of chamber filling; summing means operatively arranged to produce a sum signal, S, according to the equation, $S = K$ [fourth signal − first signal + third signal − second signal], where K is a constant; and speed control means for adjusting the rotational speed of the conveyor in response to the sum signal.

In the improved speed regulator, and the method practiced thereby, the rotational speed of the conveyor is changed in response to the magnitude and polarity of the sum signal. The sum signal may be converted into a signal which decreases as a function of time, and a pulse output may be provided when the value of such decreasing signal exceeds a predetermined reference value.

Accordingly, the general object of the invention is to provide a method and apparatus for regulating the speed of a conveyor.

Another object is to provide such a speed regulator which is particularly suited to vary the rotational speed of a screw conveyor arranged to supply plasticized material to a discharge chamber of an extruder.

Another object is to provide such an improved speed regulator which is stable, and which will not cause the conveyor speed to oscillate about a mean value.

These and other objects and advantages will become apparent from the foregoing and ongoing specification, the drawings, and the appended claims.

BRIEF DESCRIPTION OF THE DRAWINGS

FIG. 3 is a diagram depicting degree of chamber filling vs. time in the operation of a known regulator.

FIG. 4 is a diagram depicting degree of chamber filling vs. time in the operation of the improved regulator.

DESCRIPTION OF THE PREFERRED EMBODIMENT(s)

Figure 1:
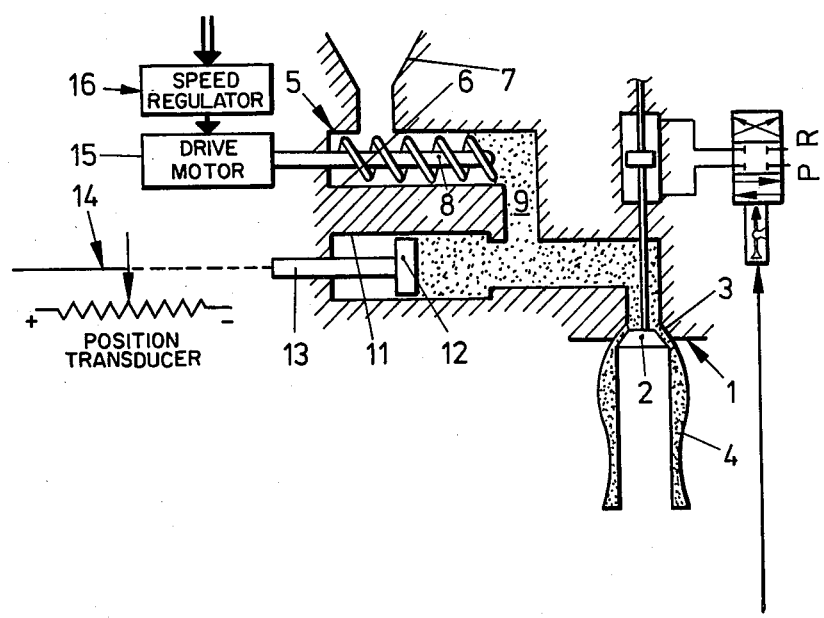
FIG. 1 is a schematic view of extrusion apparatus incorporating the improved speed regulator.

At the outset, it should be clearly understood that like reference numerals are intended to identify the same elements and/or structure consistently throughout the several drawing figures as such elements and/or structure may be further described or explained by the entire written specification of which this detailed description is an integral part.

Referring now to the several drawing figures, and more particularly FIG. 1 thereof, the present invention provides a unique improvement which is particularly suited for use in extrusion apparatus of the type used in blow-molding operations.

In FIG. 1, such extrusion apparatus is schematically shown as including a die head, generally indicated at 1, and a mandrel or pintle 2 mounted for axial movement relative to the die head to define therebetween a variable annular orifice 3 through which plasticized material may be extruded to form a depending parison 4. The position of pintle 2 may be varied by a piston-and-cylinder actuator supplied with an appropriate hydraulic signal from a servovalve. The parison may be subsequently inflated in a blow-mold (not shown) to form an article, such as a bottle or the like, of the desired shape.

The extrusion apparatus further includes a plasticizer, generally indicated at 5, having an uppermost hopper 7 which may be filled with a grannular material. Hopper 7 is arranged to supply such grannular material to a heated cylindrical chamber 6 in which such grannular material is heated and plasticized. A rotatable screw conveyor 8 is operatively arranged in chamber 6 to convey such plasticized material through a channel 9 to a variable-volume chamber defined by a plunger or piston 12 slidably mounted in a cylinder 11. A position transducer, generally indicated at 14, is operatively associated with the rod 13 of plunger 12 to convert the sensed position of plunger 12 into an analog electrical signal. The apparatus further includes a suitable actuator (not shown) connected to rod 13 and operatively arranged to move plunger 12 rightwardly relative to cylinder 11 to discharge material from the apparatus through orifice 3. A variable-speed drive motor 15 is operatively arranged to rotate screw conveyor 8 at a desired rotational speed, as determined by the improved speed regulator 16. In operation, conveyor 8 is rotated at a speed dependent upon the voltage supplied to the drive motor, and this voltage is determined by speed regulator 16.

Assume that plunger 12 is located in a rightwardly-displaced position immediately following a discharge operation (this displaced plunger position being slightly to the left of the constriction in cylinder 11), and that the pintle 2 has been moved upwardly to close the discharge orifice. Plasticized material in heated chamber 6 will be supplied by continuously-rotating screw conveyor 8 through channel 9 into the variable-volume chamber, thereby pushing plunger 12 leftwardly. Such motion of the plunger is accommodated by the plunger actuator. During this leftward movement of the plunger, transducer 14 produces signals indicating the actual volume of material supplied to the chamber, and the actual degreee of chamber filling. For example, if the plunger was in a rightwardly-displaced position y immediately after the previous discharge operation (and at the beginning of the present fill operation), and the material supplied through channel 9 pushes the plunger leftwardly to a filled position Y, then the actual volume of material supplied to the chamber will be proportional to the difference between plunger positions Y and y. At the same time, the actual degree of chamber filling may be derived from signal Y. In the disclosed embodiment, the desired degree of chamber filling is approximately 105% of the desired discharge volume, so that a 5% cushion will remain in the chamber if 100% of the desired discharge volume is extruded from the apparatus.

When the signals generated by the position transducer reach a predetermined value, and provided the mold (not shown) is ready to receive extruded material, the pintle is moved to open discharge opening 3 and the plunger is simultaneously driven rightwardly to extrude material through the orifice.

The two signals generated by the position transducer 14 are supplied to speed regulator 16 for further processing. In the speed regulator, these two signals are linked with preset signals indicating the desired degree of chamber filling and the desired discharge volume, to produce a sum signal S according to the equation:

S=K [actual degree of chamber filling−desired degree of chamber filling+actual fill volume−desired discharge volume]

where K is a constant.

A control signal, reflective of the magnitude and polarity of sum signal S, is used to change or modify the voltage supplied to dirve motor 15, if need be, and, concomitantly, the rotational speed of conveyor 8. If the rotational speed of the conveyor is reduced, then material will be supplied to the variable-volume chamber at a slower rate. Conversely, if the conveyor speed is increased, then material will be supplied to the chamber at a faster rate.

Figure 2:
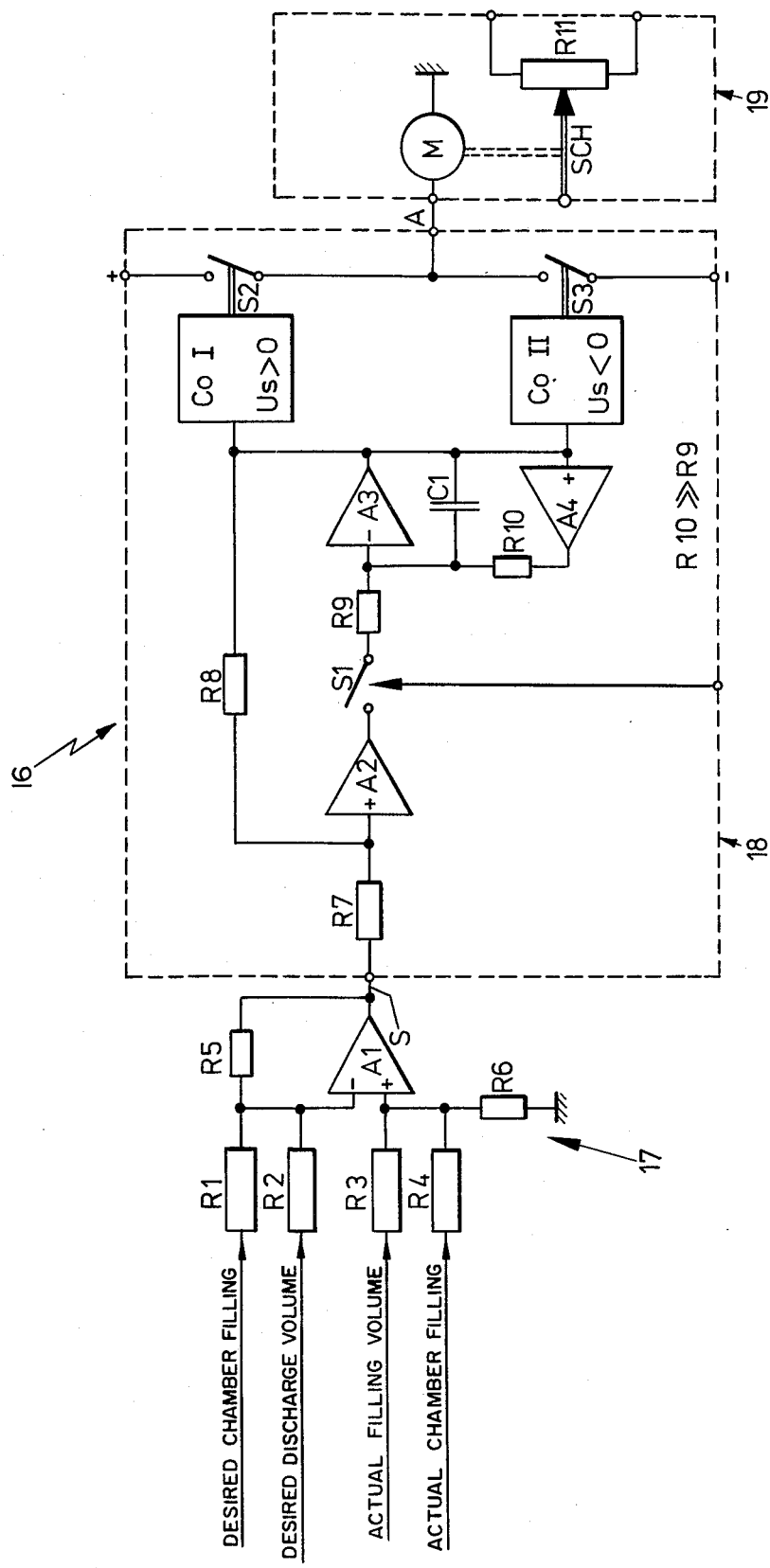
FIG. 2 is an electrical schematic of the improved speed regulator, this view showing the summing means, the converter means, and the speed control means.

Referring now to FIG. 2, the improved speed regulator 16 is shown as broadly including summing means 17, converter means 18, and speed control means 19.

The summing means 17 is shown as including an operational amplifier A1 having its non-inverting inlet connected to ground through resistor R6, and having its outlet and inverting inlet connected through a feedback resistor R5. A first signal, reflective of the desired degree of chamber filling, may be generated by a set point generator (not shown), and is supplied to the inverting inlet of amplifier A1 through resistor R1. A second signal, reflective of the desired discharge volume, may also be generated by a set point generator (not shown), and is supplied to the inverting inlet of amplifier A1 through resistor R2. A third signal, reflective of the actual filling volume (e.g., such as the difference between plunger positions Y and y), is produced by or derived from transducer 14 and is supplied to the non-inverting inlet of amplifier A1 through resistor R3. A fourth signal, reflective of the actual degree of chamber filling (e.g., such as plunger position Y), is produced by or derived from transducer 14 and is supplied to the non-inverting inlet of amplifier A1 through resistor R4.

The output of amplifier A1 is a sum signal S which is proportional to the weighted sum of the four input signals. If resistors R1, R2, R3 and R4 are all equal, then sum signal S will be proportional to the arithmetic sum of the four signals. Or, S=K [actual chamber filling−desired chamber filling+actual filling volume−desired discharge volume]

where K is a constant.

The converter means 18 is shown as including an operational amplifier A2, the inverting inlet of which is grounded. The non-inverting inlet of amplifier A2 is supplied with sum signal S through a resistor R7. The output of amplifier A2 is supplied to the inverting inlet of an operational amplifier A3 through a transistor switch S1 and a resistor R9. The non-inverting inlet of amplifier A3 is grounded. The output of amplifier A3 is connected to the node between resistor R7 and the non-inverting inlet of amplifier A2 through a resistor R8. A capacitor C1 is arranged in parallel with the inverting inlet and output of amplifier A3. The output of amplifier A3 is supplied to the non-inverting inlet of operational amplifier A4, the inverting inlet of which is grounded. The output of amplifier A4 is connected to the node between the inverting inlet of amplifier A3 and capacitor C1 through resistor R10. The value of resistor R10 is substantially greater than the value of resistor R9. The output of amplifier A3 is supplied to a first comparator CO I and a second comparator CO II. The reference voltage of comparator CO I is positive (i.e., $U_s>0$), whereas the reference voltage of comparator CO II is of the same magnitude, but has a negative sign (i.e., $U_s<0$). The outputs of comparators CO I and CO II are arranged to operate relay switches S2 and S3, respectively. When switch S2 is closed, a positive voltage is supplied from a source thereof to converter output A. Conversely, when switch S3 is closed, a negative voltage is supplied from a source thereof to converter output A.

The speed control means 19 includes a motor M connected to the converter output A. Motor M moves a slider SCH of a potentiometer R11 in one direction if converter output A is positive, and in the opposite direction if converter output A is negative. The variable voltage tapped off potentiometer R11 is supplied to drive motor 15.

In operation, sum signal S is produced at the output of the summing means, and is supplied to the converter 18. Switch S1 is closed for approximately 10 milliseconds at the beginning of each discharge operation. The signal to close switch S1 is obtained from an AND circuit (not shown) linking a "mold ready" signal to a "minimum degree of chamber filling" signal. This enables the mold to be brought to a "ready" condition, for example, when starting the apparatus, without requiring that the variable-volume chamber be already filled. Closure of switch S1 causes a control circuit A2, S1, R9, A3 and R8 to be energized. Hence, when S1 is closed, amplifier A3 will produce a voltage proportional to sum signal S. Since resistor R10 is substantially greater than resistor R9, the current flowing through resister R10 does not affect the voltage produced at the output of amplifier A3.

Assume that the sum signal S is positive. This means that the rotational speed of conveyor 8 is too high. In this case, switch S3 is closed, and a negative voltage is supplied to motor M to move slider SCH and to reduce the voltage supplied to the drive motor 15. When switch S1 is opened, capacitor C1, which has charged to the output voltage of amplifier A3, begins to discharge through amplifier A4 and resistor R10, thereby reducing the output voltage of amplifer A3 to zero. When the magnitude of such decreasing voltage falls below the threshold voltage $U_s$ of comparator CO II, relay S3 opens. During the time interval between such closing and opening of relay S3, motor M moves the slider SCH of potentiometer R11 in the appropriate direction. If sum signal S is negative, then switch S2 will be closed for a discrete time interval, resulting in an increased voltage supplied to drive motor 15.

The greater the magnitude of sum signal S, the longer the time needed for capacitor C1 to discharge down to the reference value established in the comparators. Since relays S2 or S3 are closed whenever the magnitude of the signal sensed at the output of comparator A3 exceeds the reference value, the greater the magnitude of sum signal S, the longer that the appropriate relay will be closed, and the longer the length of the corrective pulse supplied to motor M. In other words, the length of time that the appropriate relay will be closed, depends upon the magnitude of sum signal S. Of course, the longer that the appropriate relay is closed, the greater the correction of potentiometer R11 and the voltage supplied to the drive motor 15. The direction of slider movement is related to the polarity of the sum signal.

The sensitivity of the speed regulator can be adjusted by varying the reference voltages $U_s$ of the comparators. If the reference voltage is relatively large, the drive motor voltage will not be adjusted for relatively small values of sum signal S, and vice versa.

In the preferred embodiment, the signal representing the desired degree of chamber filling is selected to be approximately 105% of the minimum degree of chamber filling, this being the desired discharge volume. The excess of 5% ensures that there will be a "cushion" of excess material in the chamber prior to the discharge operation.

The operation of the improved speed regulator over a known speed regulator, is comparatively illustrated in FIGS. 3 and 4.

In each case, assume that the conveyor speed is initially correct and that the chamber is actually filled to the desired degree of filling (e.g., 105% of the desired discharge volume), and that a "cushion" of 5% remains in the chamber after each discharge operation. In the known method, there is no difference between the actual and desired degrees of filling, and no conveyor speed correction is needed. In the improved regulator, the difference between the actual filling volume and the desired discharge volume is also zero, and no correction of conveyor speed is indicated.

Now assume that, for some reason, the volume of material supplied to the chamber between $t_1$ and $t_2$ increases by 5% despite the constant speed of the conveyor. This may be due, for example, to a difference in the consistency of the plasticized material. In either case, at time $t_2$, the actual fill volume will be 105% and the actual degree of chamber filling will be similarly increased by 5% to 110%. If the desired volume (100%) is discharged, then the "cushion" of material remaining in the chamber following such discharge operation will be 10%, as indicated between $t_2$ and $t_3$.

In the known method (FIG. 3), when the actual degree of chamber filling (110%) exceeds the desired degree of chamber filling (105%) by 5%, the conveyor speed will be reduced by 5% so that the actual filling volume on the next cycle will be 5% lower, or 100%. Hence, between $t_2$ and $t_3$, the actual fill volume will be 100%, but the actual degree of chamber filling (110%) will again exceed the desired degree of chamber filling (105%) because of the 10% cushion remaining after the previous discharge operation. This further reduces the conveyor speed by 5%, and the actual volume conveyed to the chamber during the next fill cycle will be further reduced by 5% to 95%. Hence, at time $t_4$, the actual degree of chamber filling will be 105%, as desired, and no further correction in conveyor speed will be indicated. However, the fill volume supplied to the chamber between $t_4$ and $t_5$ will again be 95%. Hence, at $t_5$, the actual degree of chamber filling will only be 100%, and not the 105% desired. This causes the conveyor speed to be increased by 5% so that between $t_5$ and $t_6$, the fill volume will be increased by 5% to 100%. However, because the "cushion" was completely discharged between $t_5$ and $t_6$, the addition of a 100% fill volume will cause the actual degree of chamber filling to be only 100% at $t_6$. This further increases the conveyor speed by 5% so that between $t_6$ and $t_7$, a fill volume of 105% wll cause the actual degree of chamber filling to be 105%. However, since the conveyor speed is 5% faster than needed to supply a 100% fill volume, the fill volume of 105% between $t_7$ and $t_8$ will cause the actual degree of chamber filling to be 110% at $t_8$, and so forth. Hence, this known form of speed regulation continuously over corrects, oscillates about a mean valve, and is not stable.

The operation of the improved speed regulator is shown in FIG. 4. Between $t_0$ and $t_1$, the regulator is operating normally. That is, the actual and desired degrees of chamber filling are each 105%, and the fill and discharge volumes are each 100%. Or, $$S = 105 - 105 + 100 - 100 = 0$$

If, for some reason, the actual fill volume increases by 5% to 105% between $t_1$ and $t_2$, the actual degree of chamber filling will also rise by 5% to 110%. Or, at $t_2$, $$S = 110 - 105 + 105 - 100 = 10\%$$

This positive sum signal reduces the conveyor speed by 10% so that the actual fill volume will be correspondingly reduced by 10% to 95% (i.e., 105% − 10% = 95%) between $t_2$ and $t_3$. The "cushion" remaining in the chamber after the discharge operation between $t_2$ and $t_3$ was 10% (i.e., 110% − 100% = 10%). Hence, during the next filling operation, the actual degree of chamber filling will be 105% (10% + 95% = 105%). Or, at $t_3$:

$$S = 105 - 105 + 95 - 100 = -5\%$$

This negative sum signal increases the conveyor speed by 5% so that the actual fill volume will be 100% (95% + 5% = 100%) during the next filling operation. The cushion was 5% following the previous discharge operation between $t_3$ and $t_4$. Hence, when a 100% fill volume is added, the actual degree of filling at $t_4$ will be 105%, as desired. Or, at $t_4$, $$S = 105 - 105 + 100 - 100 = 0$$

This zero sum signal indicates that no further correction is needed. Hence, the conveyor speed has been fully corrected, and stable operation is resumed at $t_4$ in FIG. 4.

Hence, the improved speed regulator is stable, and does not oscillate about a mean value, as did the known regulator depicted in FIG. 3.

Of course, many changes and modifications may be made. Persons skilled in this art may readily devise other means for generating or producing the four signals supplied to amplifier A1, or their analogs or functional equivalents. Similarly, other means, functionally equivalent to converter 18 or speed control debvice 19, may be substituted for the specific structure shown in FIG. 2. In the embodiment illustrated in FIG. 2, all four input signals to amplifier A1 are positive. This may be readily changed. For example, in an alternative regulator, the signals representing the actual and desired degrees of chamber filling may both be supplied to the same inlet of amplifier A1, if one signal is positive and the other is negative. Hence, the input signals to amplifier A1 need not all be positive. Secondly, the improved speed regulator disclosed and claimed herein is not limited to use with extrusion apparatus. For example, apparatus similar to that shown in FIG. 1 could be used to discharge a metered amount of liquid. In this case, the screw conveyor would be replaced by a pump. Hence, as used in the appended claims, the term "conveyor" is intended broadly in a generic sense to include a screw conveyor, a pump, or some other type of device for conveying a material. Also, the term "material" should be construed as including liquids as well as semi-solid plasticized materials commonly used in extrusion apparatus.

Therefore, while a preferred embodiment of the improved speed regulator has been shown and described, persons skilled in this art will readily appreciate that various changes and modifications may be made without departing from the spirit of the invention, as defined by the following claims.

What is claimed is:

1. In apparatus having a rotatable conveyor, a variable-speed motor operatively arranged to rotate said conveyor, and a variable-volume chamber defined by a piston slidably mounted in a cylinder, wherein said conveyor is arranged to supply material to said chamber, and wherein said piston is arranged to be moved in one direction to permit filling of said chamber and moved in the opposite direction to discharge material from said chamber, the improved method which comprises the steps of:
   generating a first signal indicating the desired degree of filling of said chamber;
   generating a second signal indicating the desired volume of material to be discharged from said chamber;
   generating a third signal indicating the actual volume of material supplied to said chamber;
   generating a fourth signal indicating the actual degree of filling of said chamber;
   producing a sum signal, S, according to the equation:
   S = K [fourth signal − first signal + third signal − second signal]
   where K is a constant; and
   varying the rotational speed of said conveyor in response to said sum signal.

2. The method as set forth in claim 1 comprising the further steps of:
   converting said sum signal to a pulse signal; and
   varying the rotational speed of said conveyor in a manner related to the polarity of said sum signal.

3. The method as set forth in claim 2 wherein the step of converting said sum signal to a pulse signal, comprises the further steps of:
   converting the magnitude of said sum signal to a signal having a magnitude which decreases as a function of time;
   comparing the value of such decreasing signal with a predetermined value; and
   producing said pulse signal when the value of said decreasing signal exceeds said predetermined value.

4. The method as set forth in claim 1 wherein the value of said first signal is substantially equal to 105% of the value of said second signal.

5. The method as set forth in claim 1 and comprising the further step of:
   discharging material from said chamber when the value of said fourth signal is at least equal to the value of said first signal.

6. In apparatus having a rotatable conveyor, a variable-speed motor operatively arranged to rotate said conveyor, and a variable-volume chamber defined by a piston slidably mounted in a cylinder, wherein said conveyor is arranged to supply material to said chamber, and wherein said piston is arranged to be moved in the opposite direction to permit filling of said chamber and moved in the opposite direction to discharge material from said chamber, the improvement which comprises:

first means for generating a first signal indicating the desired degree of filling of said chamber;

second means for generating a second signal indicating the desired volume of material to be discharged from said chamber;

third means for generating a third signal indicating the actual volume of material supplied to said chamber;

fourth means for generating a fourth signal indicating the actual degree of filling of said chamber;

summing means operatively arranged to produce a sum signal, S, according to the equation:

S=K [fourth signal−first signal+third signal−second signal]

where K is a constant; and speed control means for adjusting the rotational speed of said conveyor in response to said sum signal.

7. The improvement as set forth in claim 6 wherein said summing means includes an operational amplifier arranged to receive said first and second signals at the inverting inlet thereof, arranged to receive said third and fourth signals at the non-inverting inlet thereof, and wherein the outlet thereof is converted to the inverting inlet thereof through a feedback resistor.

8. The improvement as set forth in claim 6 and further comprising:

converter means operatively arranged between said summing means and said speed control means to convert said sum signal to a pulse signal during a discrete time interval.

9. The improvement as set forth in claim 8 wherein the polarity of said pulse signal is related to the polarity of said sum signal.

10. The improvement as set forth in claim 8 wherein the length of said time interval is related to the magnitude of said sum signal.

11. The improvement as set forth in claim 8 wherein said converter means further includes:

time decay means operatively arranged to convert the magnitude of said sum signal into a signal having a magnitude which decreases as a function of time; and comparator means arranged to compare the magnitude of such decreasing signal with a predetermined value and operative to produce said pulse signal when said decreasing signal exceeds said predetermined value.

12. The improvement as set forth in claim 11 wherein said comparator means includes a voltage source, a relay interposed between said source and said speed control means, and a comparator operatively arranged to close said relay when said decreasing signal is greater than said predetermined value.

* * * * *